(12) United States Patent
Marcu et al.

(10) Patent No.: US 8,990,064 B2
(45) Date of Patent: Mar. 24, 2015

(54) TRANSLATING DOCUMENTS BASED ON CONTENT

(75) Inventors: Daniel Marcu, Hermosa Beach, CA (US); Radu Soricut, Manhattan Beach, CA (US); Narayanaswamy Viswanathan, Palo Alto, CA (US)

(73) Assignee: Language Weaver, Inc., Los Angeles, CA (US)

( * ) Notice: Subject to any disclaimer, the term of this patent is extended or adjusted under 35 U.S.C. 154(b) by 1179 days.

(21) Appl. No.: 12/510,913

(22) Filed: Jul. 28, 2009

(65) Prior Publication Data

US 2011/0029300 A1    Feb. 3, 2011

(51) Int. Cl.
*G06F 17/20*    (2006.01)
*G06F 17/28*    (2006.01)

(52) U.S. Cl.
CPC .................................. *G06F 17/289* (2013.01)
USPC .............. 704/2; 715/264; 707/736; 705/7.14; 704/4; 704/3; 704/257; 704/10

(58) Field of Classification Search
USPC ......... 707/999.004, 736; 704/2, 4, 3, 257, 10; 715/264; 705/7.14
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,615,002 A | 9/1986 | Innes | |
| 4,661,924 A | 4/1987 | Okamoto et al. | |
| 4,787,038 A | 11/1988 | Doi et al. | |
| 4,791,587 A | 12/1988 | Doi | |
| 4,800,522 A | 1/1989 | Miyao et al. | |
| 4,814,987 A | 3/1989 | Miyao et al. | |
| 4,942,526 A | 7/1990 | Okajima et al. | |
| 4,980,829 A | 12/1990 | Okajima et al. | |
| 5,020,112 A | 5/1991 | Chou | |

(Continued)

FOREIGN PATENT DOCUMENTS

| CA | 2408819 | 11/2006 |
|---|---|---|
| CA | 2475857 | 12/2008 |

(Continued)

OTHER PUBLICATIONS

Rapp, Reinhard, ""Identifying Word Translations in Non-Parallel Texts,"" 1995, 33rd Annual Meeting of the ACL, pp. 320-322.

(Continued)

*Primary Examiner* — Michael Colucci
(74) *Attorney, Agent, or Firm* — Carr & Ferrell LLP

(57) ABSTRACT

A document containing text in a source language may be translated into a target language based on content associated with that document, in conjunction with the present technology. An indication to perform an optimal translation of a document into a target language may be received via a user interface. The document may then be accessed by a computing device. The optimal translation is executed by a preferred translation engine of a plurality of available translation engines. The preferred translation engine is the most likely to produce the most accurate translation of the document among the plurality of available translation engines. Additionally, the preferred translation engine may be identified based on content associated with the document. The document is translated into the target language using the preferred translation engine to obtain a translated document, which may then be outputted by a computing device.

19 Claims, 6 Drawing Sheets

```
Recommendation Engine 215

Predictor            Keyword
  Module               Module 305                  315

Alignment          Translation Evaluation
  Module               Module 310                  320
```

(56) References Cited

U.S. PATENT DOCUMENTS

| | | |
|---|---|---|
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,175,684 A * | 12/1992 | Chong .............................. 704/3 |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,488,725 A | 1/1996 | Turtle et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,850,561 A | 12/1998 | Church et al. |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,963,205 A | 10/1999 | Sotomayor |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,185,524 B1 | 2/2001 | Carus et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,598,046 B1 * | 7/2003 | Goldberg et al. ..................... 1/1 |
| 6,604,101 B1 | 8/2003 | Chan et al. |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,910,003 B1 | 6/2005 | Arnold et al. |
| 6,952,665 B1 | 10/2005 | Shimomura et al. |
| 6,983,239 B1 | 1/2006 | Epstein |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menezes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |

(56) References Cited

U.S. PATENT DOCUMENTS

| | | |
|---|---|---|
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,200,550 B2 * | 4/2007 | Menezes et al. ............ 704/10 |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 * | 3/2008 | Coffman et al. ............ 704/257 |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 7,974,976 B2 * | 7/2011 | Yahia et al. .................. 707/736 |
| 8,060,360 B2 | 11/2011 | He |
| 8,145,472 B2 | 3/2012 | Shore et al. |
| 8,214,196 B2 | 7/2012 | Yamada et al. |
| 8,219,382 B2 * | 7/2012 | Kim et al. ............... 704/2 |
| 8,234,106 B2 | 7/2012 | Marcu et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,296,127 B2 | 10/2012 | Marcu et al. |
| 8,315,850 B2 | 11/2012 | Furuuchi et al. |
| 8,326,598 B1 * | 12/2012 | Macherey et al. ............ 704/4 |
| 8,380,486 B2 | 2/2013 | Soricut et al. |
| 8,433,556 B2 | 4/2013 | Fraser et al. |
| 8,442,813 B1 | 5/2013 | Popat |
| 8,468,149 B1 | 6/2013 | Lung et al. |
| 8,548,794 B2 | 10/2013 | Koehn |
| 8,600,728 B2 | 12/2013 | Knight et al. |
| 8,615,389 B1 | 12/2013 | Marcu |
| 8,655,642 B2 | 2/2014 | Fux et al. |
| 8,666,725 B2 | 3/2014 | Och |
| 8,676,563 B2 | 3/2014 | Soricut et al. |
| 8,694,303 B2 | 4/2014 | Hopkins et al. |
| 8,825,466 B1 | 9/2014 | Wang et al. |
| 8,831,928 B2 | 9/2014 | Marcu et al. |
| 8,886,515 B2 | 11/2014 | Van Assche |
| 8,886,517 B2 | 11/2014 | Soricut et al. |
| 8,886,518 B1 | 11/2014 | Wang et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 * | 11/2002 | Aityan .................. 704/2 |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0129571 A1 | 7/2003 | Kim |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0023193 A1 | 2/2004 | Wen et al. |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |

(56) References Cited

U.S. PATENT DOCUMENTS

| | | |
|---|---|---|
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021323 A1 | 1/2005 | Li |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1* | 4/2005 | Krachman ............. 707/6 |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136824 A1* | 6/2006 | Lin ............. 715/531 |
| 2006/0142995 A1 | 6/2006 | Knight et al. |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0043553 A1* | 2/2007 | Dolan ............. 704/2 |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1* | 9/2007 | Tran ............. 707/3 |
| 2007/0219774 A1 | 9/2007 | Quirk |
| 2007/0233460 A1 | 10/2007 | Lancaster et al. |
| 2007/0233547 A1* | 10/2007 | Younger et al. ............. 705/9 |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore |
| 2008/0040095 A1* | 2/2008 | Sinha et al. ............. 704/2 |
| 2008/0052061 A1 | 2/2008 | Kim et al. |
| 2008/0065478 A1 | 3/2008 | Kohlmeier et al. |
| 2008/0109209 A1 | 5/2008 | Fraser et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0215418 A1 | 9/2008 | Kolve et al. |
| 2008/0249760 A1* | 10/2008 | Marcu et al. ............. 704/2 |
| 2008/0270109 A1 | 10/2008 | Och |
| 2008/0270112 A1 | 10/2008 | Shimohata |
| 2008/0281578 A1 | 11/2008 | Kumaran |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1* | 5/2009 | Jiang et al. ............. 707/4 |
| 2009/0234634 A1 | 9/2009 | Chen et al. |
| 2009/0234635 A1 | 9/2009 | Bhatt et al. |
| 2009/0241115 A1 | 9/2009 | Raffo et al. |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0138210 A1 | 6/2010 | Seo et al. |
| 2010/0138213 A1 | 6/2010 | Bicici et al. |
| 2010/0174524 A1 | 7/2010 | Koehn |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0191410 A1 | 8/2011 | Refuah et al. |
| 2011/0225104 A1 | 9/2011 | Soricut et al. |
| 2012/0096019 A1 | 4/2012 | Manickam et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |
| 2013/0024184 A1 | 1/2013 | Vogel et al. |
| 2013/0103381 A1 | 4/2013 | Assche |
| 2013/0238310 A1 | 9/2013 | Viswanathan |
| 2014/0006003 A1 | 1/2014 | Soricut et al. |
| 2014/0019114 A1 | 1/2014 | Travieso et al. |
| 2014/0149102 A1 | 5/2014 | Marcu et al. |
| 2014/0188453 A1 | 7/2014 | Marcu et al. |

FOREIGN PATENT DOCUMENTS

| | | |
|---|---|---|
| CA | 2480398 | 6/2011 |
| DE | 1488338 | 4/2010 |
| DE | 202005022113.9 | 2/2014 |
| EP | 0469884 | 2/1992 |
| EP | 0715265 | 6/1996 |
| EP | 0933712 A2 | 8/1999 |
| EP | 0933712 A3 | 1/2001 |
| EP | 1488338 | 9/2004 |
| EP | 1488338 | 4/2010 |
| ES | 1488338 | 4/2010 |
| FR | 1488338 | 4/2010 |
| GB | 1488338 | 4/2010 |
| HK | 1072987 | 2/2006 |
| HK | 1072987 | 9/2010 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| WO | WO03083709 | 10/2003 |
| WO | WO03083710 | 10/2003 |
| WO | WO2004042615 | 5/2004 |
| WO | WO2007056563 | 5/2007 |
| WO | WO2011041675 | 4/2011 |
| WO | WO2011162947 | 12/2011 |

OTHER PUBLICATIONS

Rayner et al.,"Hybrid Language Processing in the Spoken Language Translator," IEEE, pp. 107-110, 1997.

Resnik, P. and Smith, A., ""The Web as a Parallel Corpus,"" Sep. 2003, Computational Linguistics, SpecialIssue on Web as Corpus, vol. 29, Issue 3, pp. 349-380.

Resnik, P. and Yarowsky, D. ""A Perspective on Word Sense Disambiguation Methods and Their Evaluation,""1997, Proceedings of SIGLEX '97, Washington, D.C., pp. 79-86.

(56) References Cited

OTHER PUBLICATIONS

Resnik, Philip, ""Mining the Web for Bilingual Text,"" 1999, 37th Annual Meeting of the ACL, College Park, MD, pp. 527-534.

Rich, E. and Knight, K., "Artificial Intelligence, Second Edition," 1991, McGraw-Hill Book Company [Front Matter].

Richard et al., ""Visiting the Traveling Salesman Problem with Petri nets and application in the glass industry,""Feb. 1996, IEEE Emerging Technologies and Factory Automation, pp. 238-242.

Robin, Jacques, ""Revision-Based Generation of Natural Language Summaries Providing Historical Background: Corpus-Based Analysis, Design Implementation and Evaluation,"" 1994, Ph.D. Thesis, Columbia University, New York.

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

Russell, S. and Norvig, P., ""Artificial Intelligence: A Modern Approach,"" 1995, Prentice-Hall, Inc., New Jersey [Front Matter].

Sang, E. and Buchholz, S., ""Introduction to the CoNLL-2000 Shared Task: Chunking,"" 2002, Proc. ofCoNLL-2000 and LLL-2000, Lisbon, Portugal, pp. 127-132.

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

Schutze, Hinrich, ""Automatic Word Sense Discrimination,"" 1998, Computational Linguistics, Special Issue on WordSense Disambiguation, vol. 24, Issue 1, pp. 97-123.

Selman et al., ""A New Method for Solving Hard Satisfiability Problems,"" 1992, Proc. of the 10th National Conferenceon Artificial Intelligence, San Jose, CA, pp. 440-446.

Kumar, S. and Byrne, W., "Minimum Bayes-Risk Decoding for Statistical Machine Translation." HLTNAACL Conference. Mar. 2004, 8 pages.

Shapiro, Stuart (ed.), ""Encyclopedia of Artificial Intelligence, 2nd edition"", vol. D 2,1992, John Wiley & Sons Inc;""Unification"" article, K. Knight, pp. 1630-1637.

Shirai, S., "A Hybrid Rule and Example-based Method for Machine Translation," NTT Communication Science Laboratories, pp. 1-5, 1997.

Sobashima et al., ""A Bidirectional Transfer-Driven Machine Translation System for Spoken Dialogues,"" 1994, Proc.of 15th Conference on Computational Linguistics, vol. 1, pp. 64-68.

Soricut et al., ""Using a Large Monolingual Corpus to Improve Translation Accuracy,"" 2002, Lecture Notes in Computer Science, vol. 2499, Proc. of the 5th Conference of the Association for Machine Translation in theAmericas on Machine Translation: From Research to Real Users, pp. 155-164.

Stalls, B. and Knight, K., ""Translating Names and Technical Terms in Arabic Text,"" 1998, Proc. of the COLING/ACL Workkshop on Computational Approaches to Semitic Language.

Sumita et al., ""A Discourse Structure Analyzer for Japanese Text,"" 1992, Proc. of the International Conference onFifth Generation Computer Systems, vol. 2, pp. 1133-1140.

Sun et al., ""Chinese Named Entity Identification Using Class-based Language Model,"" 2002, Proc. of 19thInternational Conference on Computational Linguistics, Taipei, Taiwan, vol. 1, pp. 1-7.

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

Taylor et al., ""The Penn Treebank: An Overview,"" in A. Abeill (ed.), D Treebanks: Building and Using ParsedCorpora, 2003, pp. 5-22.

Tiedemann, Jorg, ""Automatic Construction of Weighted String Similarity Measures,"" 1999, In Proceedings ofthe Joint SIGDAT Conference on Emperical Methods in Natural Language Processing and Very Large Corpora.

Tillman, C. and Xia, F., ""A Phrase-Based Unigram Model for Statistical Machine Translation,"" 2003, Proc. of theNorth American Chapter of the ACL on Human Language Technology, vol. 2, pp. 106-108.

Tillmann et al., ""A DP Based Search Using Monotone Alignments in Statistical Translation,"" 1997, Proc. of theAnnual Meeting of the ACL, pp. 366-372.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

Ueffing et al., ""Generation of Word Graphs in Statistical Machine Translation,"" 2002, Proc. of Empirical Methods inNatural Language Processing (EMNLP), pp. 156-163.

Varga et al., "Parallel Corpora for Medium Density Languages", In Proceedings of RANLP 2005, pp. 590-596.

Veale, T. and Way, A., ""Gaijin: A Bootstrapping, Template-Driven Approach to Example-Based MT,"" 1997, Proc. ofNew Methods in Natural Language Processing (NEMPLP97), Sofia, Bulgaria.

Vogel et al., "The CMU Statistical Machine Translation System," 2003, Machine Translation Summit IX, New Orleans, LA.

Vogel et al., ""The Statistical Translation Module in the Verbmobil System,"" 2000, Workshop on Multi-Lingual SpeechCommunication, pp. 69-74.

Vogel, S. and Ney, H., ""Construction of a Hierarchical Translation Memory,"" 2000, Proc. of Cooling 2000, Saarbrucken, Germany, pp. 1131-1135.

Wang, Y. and Waibel, A., ""Decoding Algorithm in Statistical Machine Translation,"" 1996, Proc. of the 35th AnnualMeeting of the ACL, pp. 366-372.

Wang, Ye-Yi, ""Grammar Inference and Statistical Machine Translation,"" 1998, Ph.D Thesis, Carnegie MellonUniversity, Pittsburgh, PA.

Watanabe et al., ""Statistical Machine Translation Based on Hierarchical Phrase Alignment,"" 2002, 9th InternationalConference on Theoretical and Methodological Issues in Machin Translation (TMI-2002), Keihanna, Japan, pp. 188-198.

Witbrock, M. and Mittal, V., ""Ultra-Summarization: A Statistical Approach to Generating Highly Condensed Non-Extractive Summaries,"" 1999, Proc. of SIGIR '99, 22nd International Conference on Research and Development inInformation Retrieval, Berkeley, CA, pp. 315-316.

Wu, Dekai, ""A Polynomial-Time Algorithm for Statistical Machine Translation,"" 1996, Proc. of 34th Annual Meeting ofthe ACL, pp. 152-158.

Wu, Dekai, ""Stochastic Inversion Transduction Grammars and Bilingual Parsing of Parallel Corpora,"" 1997, Computational Linguistics, vol. 23, Issue 3, pp. 377-403.

Yamada, K. and Knight, K. ""A Syntax-Based Statistical Translation Model,"" 2001, Proc. of the 39th AnnualMeeting of the ACL, pp. 523-530.

Yamada, K. and Knight, K., ""A Decoder for Syntax-Based Statistical MT,"" 2001, Proceedings of the 40th AnnualMeeting of the ACL, pp. 303-310.

Yamada K., "A Syntax-Based Statistical Translation Model," 2002 PhD Dissertation, pp. 1-141.

Yamamoto et al., ""A Comparative Study on Translation Units for Bilingual Lexicon Extraction,"" 2001, JapanAcademic Association for Copyright Clearance, Tokyo, Japan.

Yamamoto et al, "Acquisition of Phrase-level Bilingual Correspondence using Dependency Structure" In Proceedings of COLING-2000, pp. 933-939.

(56) References Cited

OTHER PUBLICATIONS

Yarowsky, David, ""Unsupervised Word Sense Disambiguation Rivaling Supervised Methods,"" 1995, 33rd AnnualMeeting of the ACL, pp. 189-196.
Abney, Steven P. , ""Parsing by Chunks,"" 1991, Principle-Based Parsing: Computation and Psycholinguistics, vol. 44,pp. 257-279.
Agbago, A., et al., "True-casing for the Portage System," In Recent Advances in Natural Language Processing (Borovets, Bulgaria), Sep. 21-23, 2005, pp. 21-24.
Al-Onaizan et al., "Statistical Machine Translation," 1999, JHU Summer Tech Workshop, Final Report, pp. 1-42.
Al-Onaizan et al., ""Translating with Scarce Resources,"" 2000, 17th National Conference of the American Associationfor Artificial Intelligence, Austin, TX, pp. 672-678.
Al-Onaizan, Y. and Knight K., "Machine Transliteration of Names in Arabic Text,"Proceedings of ACL Workshop on Computational Approaches to Semitic Languages. Philadelphia, 2002.
Al-Onaizan, Y. and Knight, K., ""Named Entity Translation: Extended Abstract"", 2002, Proceedings of HLT-02, SanDiego, CA.
Al-Onaizan, Y. and Knight, K., ""Translating Named Entities Using Monolingual and Bilingual Resources,"" 2002, Proc. of the 40th Annual Meeting of the ACL, pp. 400-408.
Alshawi et al., ""Learning Dependency Translation Models as Collections of Finite-State Head Transducers,"" 2000, Computational Linguistics, vol. 26, pp. 45-60.
Alshawi, Hiyan, "Head Automata for Speech Translation", Proceedings of the ICSLP 96, 1996, Philadelphia, Pennslyvania.
Ambati, V., "Dependency Structure Trees in Syntax Based Machine Translation," Spring 2008 Report <http://www.cs.cmu.edu/~vamshi/publications/DependencyMT_report.pdf>, pp. 1-8.
Arbabi et al., ""Algorithms for Arabic name transliteration,"" Mar. 1994, IBM Journal of Research and Development,vol. 38, Issue 2, pp. 183-194.
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Ballesteros, L. et al., "Phrasal Translation and Query Expansion Techniques for Cross-Language Information Retrieval," SIGIR 97, Philadelphia, PA, © 1997, pp. 84-91.
Bangalore, S. and Rambow, O., ""Evaluation Metrics for Generation,"" 2000, Proc. of the 1st International NaturalLanguage Generation Conf., vol. 14, pp. 1-8.
Bangalore, S. and Rambow, O., ""Using TAGs, a Tree Model, and a Language Model for Generation,"" May 2000,Workshop TAG+5, Paris.
Bangalore, S. and Rambow, O., ""Corpus-Based Lexical Choice in Natural Language Generation,"" 2000, Proc. ofthe 38th Annual ACL, Hong Kong, pp. 464-471.
Bangalore, S. and Rambow, O., ""Exploiting a Probabilistic Hierarchical Model for Generation,"" 2000, Proc. of 18thconf. on Computational Linguistics, vol. 1, pp. 42-48.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.
Barnett et al., ""Knowledge and Natural Language Processing,"" Aug. 1990, Communications of the ACM, vol. 33,Issue 8, pp. 50-71.
Baum, Leonard, ""An Inequality and Associated Maximization Technique in Statistical Estimation for ProbabilisticFunctions of Markov Processes"", 1972, Inequalities 3:1-8.
Berhe, G. et al., "Modeling Service-based Multimedia Content Adaptation in Pervasive Computing," CF '04 (Ischia, Italy) Apr. 14-16, 2004, pp. 60-69.
Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

Brants, Thorsten, ""TnT—A Statistical Part-of-Speech Tagger,"" 2000, Proc. of the 6th Applied Natural LanguageProcessing Conference, Seattle.
Brill, Eric, "Transformation-Based Error-Driven Learning and Natural Language Processing: A Case Study in Part of Speech Tagging", 1995, Assocation for Computational Linguistics, vol. 21, No. 4, pp. 1-37.
Brill, Eric. ""Transformation-Based Error-Driven Learning and Natural Language Processing: A Case Study in Partof Speech Tagging"",1995, Computational Linguistics, vol. 21, No. 4, pp. 543-565.
Brown et al., ""A Statistical Approach to Machine Translation,"" Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., ""The Mathematics of Statistical Machine Translation: Parameter Estimation,"" 1993, ComputationalLinguistics, vol. 19, Issue 2, pp. 263-311.
Brown, Ralf, ""Automated Dictionary Extraction for ""Knowledge-Free"" Example-Based Translation,""1997, Proc. of 7th Int'l Cont. on Theoretical and Methodological Issues in MT, Santa Fe, NM, pp. 111-118.
Callan et al., ""TREC and TIPSTER Experiments with Inquery,"" 1994, Information Processing and Management,vol. 31, Issue 3, pp. 327-343.
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
Carl, Michael. ""A Constructivist Approach to Machine Translation,"" 1998, New Methods of Language Processingand Computational Natural Language Learning, pp. 247-256.
Chen, K. and Chen, H., ""Machine Translation: An Integrated Approach,"" 1995, Proc. of 6th Int'l Cont. on Theoreticaland Methodological Issue in MT, pp. 287-294.
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., ""Statistical Language Modeling Using the CMU-Cambridge Toolkit"", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Cohen, Yossi, "Interpreter for FUF," (available at ftp:/lftp.cs.bgu.ac.il/ pUb/people/elhadad/fuf-life.lf).
Corston-Oliver, Simon, ""Beyond String Matching and Cue Phrases: Improving Efficiency and Coverage inDiscourse Analysis"", 1998, The AAAI Spring Symposium on Intelligent Text Summarization, pp. 9-15.
Covington, "An Algorithm to Align Words for Historical Comparison", Computational Linguistics, 1996,vol. 22, No. 4, pp. 481-496.
Dagan, I. and Itai, A., ""Word Sense Disambiguation Using a Second Language Monolingual Corpus"", 1994, Association forComputational Linguistics, vol. 20, No. 4, pp. 563-596.
Dempster et al., ""Maximum Likelihood from Incomplete Data via the EM Algorithm"", 1977, Journal of the RoyalStatistical Society, vol. 39, No. 1, pp. 1-38.
Diab, M. and Finch, S., ""A Statistical Word-Level Translation Model for Comparable Corpora,"" 2000, In Proc.of theConference on Content Based Multimedia Information Access (RIAO).

(56) References Cited

OTHER PUBLICATIONS

Diab, Mona, ""An Unsupervised Method for Multilingual Word Sense Tagging Using Parallel Corpora: APreliminary Investigation"", 2000, SIGLEX Workshop on Word Senses and Multi-Linguality, pp. 1-9.
Eisner, Jason, "Learning Non-Isomorphic Tree Mappings for Machine Translation," 2003, In Proc. of the 41st Meeting of the ACL, pp. 205-208.
Elhadad et al., "Floating Constraints in Lexical Choice", 1996, ACL, vol. 23 No. 2, pp. 195-239.
Elhadad, M. and Robin, J., ""An Overview of SURGE: a Reusable Comprehensive Syntactic RealizationComponent,"" 1996, Technical Report 96-03, Department of Mathematics and Computer Science, Ben GurionUniversity, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad, Michael, ""FUF: the Universal Unifier User Manual Version 5.2"", 1993, Department of Computer Science,Ben Gurion University, Beer Sheva, Israel.
Elhadad, Michael, ""Using Argumentation to Control Lexical Choice: A Functional Unification Implementation"",1992, Ph.D. Thesis, Graduate School of Arts and Sciences, Columbia University.
Elhadad, M. and Robin, J., ""SURGE: a Comprehensive Plug-in Syntactic Realization Component for TextGeneration"", 1999 (available at http://www.cs.bgu.ac.il/-elhadad/pub.html).
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.
Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.
Fung et al, "Mining Very-Non-Parallel Corpora: Parallel Sentence and Lexicon Extraction via Bootstrapping and EM", In EMNLP 2004.
Fung, P. and Yee, L., ""An IR Approach for Translating New Words from Nonparallel, Comparable Texts"", 1998,36th Annual Meeting of the ACL, 17th International Conference on Computational Lunguistics, pp. 414-420.
Fung, Pascale, ""Compiling Bilingual Lexicon Entries From a Non-Parallel English-Chinese Corpus"", 1995, Proc, ofthe Third Workshop on Very Large Corpora, Boston, MA, pp. 173-183.
Gale, W. and Church, K., ""A Program for Aligning Sentences in Bilingual Corpora,"" 1991, 29th Annual Meeting ofthe ACL, pp. 177-183.
Gale, W. and Church, K., "A Program for Aligning Sentences in Bilingual Corpora," 1993, Computational Linguistics, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.
Germann et al., ""Fast Decoding and Optimal Decoding for Machine Translation"", 2001, Proc. of the 39th AnnualMeeting of the ACL, Toulouse, France, pp. 228-235.
Germann, Ulrich: ""Building a Statistical Machine Translation System from Scratch: How Much Bang for theBuck Can We Expect?"" Proc. of the Data-Driven MT Workshop of ACL-01, Toulouse, France, 2001.

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grefenstette, Gregory, ""The World Wide Web as a Resource for Example-Based Machine TranslationTasks"", 1999, Translating and the Computer 21, Proc. of the 21 st International Cant. on Translating and theComputer. London, UK, 12 pp.
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structure N-gram Language Model in Generation-Heavy Hybrid Machine Translation," University of Maryland, Univ. Institute for Advance Computer Studies, Sep. 8, 2004.
Hatzivassiloglou, V. et al., ""Unification-Based Glossing"", 1995, Proc. of the International Joint Conference onArtificial Intelligence, pp. 1382-1389.
Huang et al., "Relabeling Syntax Trees to Improve Syntax-Based Machine Translation Quality," Jun. 4-9, 2006, in Proc. of the Human Language Technology Conference of the North Americna Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
Jelinek, F., ""Fast Sequential Decoding Algorithm Using a Stack"", Nov. 1969, IBM J. Res. Develop., vol. 13, No. 6, pp. 675-685.
Jones, K. Sparck, ""Experiments in Relevance Weighting of Search Terms"", 1979, Information Processing &Management, vol. 15, Pergamon Press Ltd., UK, pp. 133-144.
Klein et al., "Accurate Unlexicalized Parsing," Jul. 2003, in Proc. of the 41st Annual Meeting of the ACL, pp. 423-430.
Knight et al., ""Integrating Knowledge Bases and Statistics in MT,"" 1994, Proc. of the Conference of the Associationfor Machine Translation in the Americas.
Knight et al., ""Filling Knowledge Gaps in a Broad-Coverage Machine Translation System"", 1995, Proc. ofthe14th International Joint Conference on Artificial Intelligence, Montreal, Canada, vol. 2, pp. 1390-1396.
Knight, K. and Al-Onaizan, Y., ""A Primer on Finite-State Software for Natural Language Processing"", 1999 (available at http://www.isLedullicensed-sw/carmel).
Knight, K. and Al-Onaizan, Y., "Translation with Finite-State Devices," Proceedings of the 4th AMTA Conference, 1998.
Knight, K. and Chander, I., ""Automated Postediting of Documents,""1994, Proc. of the 12th Conference on ArtificialIntelligence, pp. 779-784.
Knight, K. and Graehl, J., "Machine Transliteration", 1997, Proc. of the ACL-97, Madrid, Spain, pp. 128-135.
Knight, K. and Hatzivassiloglou, V., ""Two-Level, Many-Paths Generation,"" 1995, Proc. of the 33rd AnnualConference of the ACL, pp. 252-260.
Knight, K. and Luk, S., ""Building a Large-Scale Knowledge Base for Machine Translation,"" 1994, Proc. of the 12thConference on Artificial Intelligence, pp. 773-778.
Knight, K. and Marcu, D., ""Statistics-Based Summarization—Step One: Sentence Compression,"" 2000, AmericanAssociation for Artificial Intelligence Conference, pp. 703-710.
Knight, K. and Yamada, K., ""A Computational Approach to Deciphering Unknown Scripts,"" 1999, Proc. of the ACLWorkshop on Unsupervised Learning in Natural Language Processing.

(56) References Cited

OTHER PUBLICATIONS

Knight, Kevin, ""A Statistical MT Tutorial Workbook,"" 1999, JHU Summer Workshop (available at http://www.isLedu/natural-language/mUwkbk.rtf).
Knight, Kevin, "Automating Knowledge Acquisition for Machine Translation," 1997, AI Magazine, vol. 18, No. 4.
Knight, Kevin, ""Connectionist Ideas and Algorithms,"" Nov. 1990, Communications of the ACM, vol. 33, No. 11, pp. 59-74.
Knight, Kevin, ""Decoding Complexity in Word-Replacement Translation Models"", 1999, Computational Linguistics, vol. 25, No. 4.
Knight, Kevin, ""Integrating Knowledge Acquisition and Language Acquisition"", May 1992, Journal of AppliedIntelligence, vol. 1, No. 4.
Knight, Kevin, ""Learning Word Meanings by Instruction,""1996, Proc. of the D National Conference on ArtificialIntelligence, vol. 1, pp. 447-454.
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
Koehn, P. and Knight, K., ""ChunkMT: Statistical Machine Translation with Richer Linguistic Knowledge,"" Apr. 2002,Information Sciences Institution.
Koehn, P. and Knight, K., ""Estimating Word Translation Probabilities from Unrelated Monolingual Corpora Usingthe EM Algorithm,"" 2000, Proc. of the 17th meeting of the AAAI.
Zhang et al., "Synchronous Binarization for Machine Translations," Jun. 4-9, 2006, in Proc. of the Human Language Technology Conference of the North American Chapter of the ACL, pp. 256-263.
Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
Patent Cooperation Treaty International Preliminary Report on Patentability and The Written Opinion, Internationalapplication No. PCT/US2008/004296, Oct. 6, 2009, 5 pgs.
Document, Wikipedia.com, web.archive.org (Feb. 24, 2004) <http://web.archive.org/web/20040222202831 /http://en.wikipedia.org/wikiiDocument>, Feb. 24, 2004.
Identifying, Dictionary.com, wayback.archive.org (Feb. 28, 2007) <http://wayback.archive.org/web/200501 01OOOOOO*/http://// dictionary.reference.com//browse//identifying>, Feb. 28, 2005 <http://web.archive.org/web/20070228150533/http://dictionary.reference.com/browse/identifying>.
Koehn, P. et al, "Statistical Phrase-Based Translation," Proceedings of HLT-NAACL 2003 Main Papers, pp. 48-54 Edmonton, May-Jun. 2003.
Abney, S.P., "Stochastic Attribute Value Grammars", Association for Computional Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.
Tillman, C., et al, "Word Reordering and a Dynamic Programming Beam Search Algorithm for Statistical Machine Translation," 2003, Association for Computational Linguistics, vol. 29, No. 1, pp. 97-133 <URL:http://acl.ldc.upenn.edu/J/J03/J03-1005.pdf>.
Wang, W., et al. "Capitalizing Machine Translation" In HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Koehn, P. and Knight, K., ""Knowledge Sources for Word-Level Translation Models,"" 2001, Conference on EmpiricalMethods in Natural Language Processing.
Kumar, R. and Li, H., ""Integer Programming Approach to Printed Circuit Board Assembly Time Optimization,"" 1995,IEEE Transactions on Components, Packaging, and Manufacturing, Part B: Advance Packaging, vol. 18,No. 4. pp. 720-727.
Kupiec, Julian, "An Algorithm for Finding Noun Phrase Correspondences in Bilingual Corpora," In Proceedings of the 31st Annual Meeting of the ACL, 1993, pp. 17-22.
Kurohashi, S. and Nagao, M., ""Automatic Detection of Discourse Structure by Checking Surface Information inSentences,"" 1994, Proc. of COL-LING '94, vol. 2, pp. 1123-1127.
Langkilde, I. and Knight, K., ""Generation that Exploits Corpus-Based Statistical Knowledge,"" 1998, Proc. of theCOLING-ACL, pp. 704-710.
Langkilde, I. and Knight, K., ""The Practical Value of N-Grams in Generation,"" 1998, Proc. of the 9th InternationalNatural Language Generation Workshop, pp. 248-255.
Langkilde, Irene, ""Forest-Based Statistical Sentence Generation,"" 2000, Proc. of the 1st Conference on NorthAmerican chapter of the ACL, Seattle, WA, pp. 170-177.
Langkilde-Geary, Irene, ""A Foundation for General-Purpose Natural Language Generation: SentenceRealization Using Probabilistic Models of Language,"" 2002, Ph.D. Thesis, Faculty of the Graduate School, Universityof Southern California.
Langkilde-Geary, Irene, ""An Empirical Verification of Coverage and Correctness for a General-PurposeSentence Generator,"" 1998, Proc. 2nd Int'l Natural Language Generation Conference.
Lee, Yue-Shi,""Neural Network Approach to Adaptive Learning: with an Application to Chinese Homophone Disambiguation,"" IEEE pp. 1521-1526, 2002.
Lita, L., et al., "tRuEcaslng," Proceedings of the 41st Annual Meeting of the Assoc. for Computational Linguistics (In Hinrichs, E. and Roth, D.—editors), pp. 152-159, 2003.
Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.
Mann, G. and Yarowsky, D., ""Multipath Translation Lexicon Induction via Bridge Languages,"" 2001, Proc. of the 2nd Conference of the North American Chapter of the ACL, Pittsburgh, PA, pp. 151-158.
Manning, C. and Schutze, H., ""Foundations of Statistical Natural Language Processing,"" 2000, The MIT Press, Cambridge, MA [Front Matter].
Marcu, D. and Wong, W., ""A Phrase-Based, Joint Probability Model for Statistical Machine Translation,"" 2002, Proc.of ACL-2 conference on Empirical Methods in Natural Language Processing, vol. 10, pp. 133-139.
Marcu, Daniel, ""Building Up Rhetorical Structure Trees,"" 1996, Proc. of the National Conference on ArtificialIntelligence and Innovative Applications of Artificial Intelligence Conference, vol. 2, pp. 1069-1074.
Marcu, Daniel, ""Discourse trees are good indicators of importance in text,"" 1999, Advances in Automatic TextSummarization, The MIT Press, Cambridge, MA.
Marcu, Daniel, ""Instructions for Manually Annotating the Discourse Structures of Texts,"" 1999, DiscourseAnnotation, pp. 1-49.
Marcu, Daniel, ""The Rhetorical Parsing of Natural Language Texts,"" 1997, Proceedings of ACLIEACL '97, pp. 96-103.
Marcu, Daniel, ""The Rhetorical Parsing, Summarization, and Generation of Natural Language Texts,"" 1997, Ph. D.Thesis, Graduate Department of Computer Science, University of Toronto.

(56) References Cited

OTHER PUBLICATIONS

Marcu, Daniel, ""Towards a Unified Approach to Memory- and Statistical-Based Machine Translation,"" 2001, Proc.of the 39th Annual Meeting of the ACL, pp. 378-385.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

Melamed, I. Dan, ""A Word-to-Word Model of Translational Equivalence,"" 1997, Proc. of the 35th Annual Meeting ofthe ACL, Madrid, Spain, pp. 490-497.

Melamed, I. Dan, ""Automatic Evaluation and Uniform Filter Cascades for Inducing N-Best Translation Lexicons,""1995, Proc. of the 3rd Workshop on Very Large Corpora, Boston, MA, pp. 184-198.

Melamed, I. Dan, ""Empirical Methods for Exploiting Parallel Texts,"" 2001, MIT Press, Cambridge, MA [table ofcontents].

Meng et al.. ""Generating Phonetic Cognates to Handle Named Entities in English-Chinese Cross-LanguageSpoken Document Retrieval,"" 2001, IEEE Workshops on Automatic Speech Recognition and Understanding. pp. 311-314.

Metze, F. et al., "The NESPOLE! Speech-to-Speech Translation System," Proc. of the HLT 2002, 2nd Int'l Conf. on Human Language Technology (San Francisco, CA), © 2002, pp. 378-383.

Mikheev et al., ""Named Entity Recognition without Gazeteers,"" 1999, Proc. of European Chapter of the ACL, Bergen,Norway, pp. 1-8.

Miike et al., ""A Full-Text Retrieval System with a Dynamic Abstract Generation Function,"" 1994, Proceedings of SI-GIR'94, pp. 152-161.

Mohri, M. and Riley, M., ""An Efficient Algorithm for the N-Best-Strings Problem,"" 2002, Proc. of the 7th Int. Conf. onSpoken Language Processing (ICSLP'02), Denver, CO, pp. 1313-1316.

Mohri, Mehryar, "Regular Approximation of Context Free Grammars Through Transformation", 2000, pp. 251-261, "Robustness in Language and Speech Technology", Chapter 9, Kluwer Academic Publishers.

Monasson et al., ""Determining Computational Complexity from Characteristic 'Phase Transitions',"" Jul. 1999, NatureMagazine, vol. 400, pp. 133-137.

Mooney, Raymond, ""Comparative Experiments on Disambiguating Word Senses: An Illustration of the Role of Biasin Machine Learning,"" 1996, Proc. of the Conference on Empirical Methods in Natural Language Processing, pp. 82-91.

Nagao, K. et al., "Semantic Annotation and Transcoding: Making Web Content More Accessible," IEEE Multimedia, vol. 8, Issue 2 Apr.-Jun. 2001, pp. 69-81.

Nederhof, M. and Satta, G., ""IDL-Expressions: A Formalism for Representing and Parsing Finite Languages inNatural Language Processing,"" 2004, Journal of Artificial Intelligence Research, vol. 21, pp. 281-287.

Nieben, S. and Ney, H, ""Toward Hierarchical Models for Statistical Machine Translation of Inflected Languages,"" 2001,Data-Driven Machine Translation Workshop, Toulouse, France, pp. 47-54.

Norvig, Peter, "Techniques for Automatic Memoization with Applications to Context-Free Parsing", Compuational Linguistics,1991, pp. 91-98, vol. 17, No. 1.

Och et al., ""Improved Alignment Models for Statistical Machine Translation,"" 1999, Proc. of the Joint Conf. ofEmpirical Methods in Natural Language Processing and Very Large Corpora, pp. 20-28.

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI=http://dx.doi.org/10.3115/1075096.

Och, F. and Ney, H, ""Improved Statistical Alignment Models,"" 2000, 38th Annual Meeting of the ACL, Hong Kong, pp. 440-447.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

Papineni et al., ""Bleu: a Method for Automatic Evaluation of Machine Translation,"" 2001, IBM Research Report, RC22176(WQ102-022).

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

Pla et al., ""Tagging and Chunking with Bigrams,"" 2000, Proc. of the 18th Conference on Computational Linguistics, vol. 2, pp. 614-620.

Qun, Liu, "A Chinese-English Machine Translation System Based on Micro-Engine Architecture," An Int'l. Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in CONTRAST—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Mar. 1, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 9, 2013 in Japanese Patent Application 2007-536911 filed Oct. 12, 2005.

(56) References Cited

OTHER PUBLICATIONS

Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed Mar. 1, 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problmens and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Notice of Allowance mailed Dec. 10, 2013 in Japanese Patent Application 2007-536911, filed Oct. 12, 2005.
Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.
Specia et al. "Improving the Confidence of Machine Translation Quality Estimates," MT Summit XII, Ottawa, Canada, 2009, 8 pages.
Soricut et al., "TrustRank: Inducing Trust in Automatic Translations via Ranking", published In Proceedings of the 48th Annual Meeting of the Association for Computational Linguistics (Jul. 2010), pp. 612-621.
U.S. Appl. No. 11/454,212, filed Jun. 15, 2006.
Editorial Free Lancer Association, Guidelines for Fees, https://web.archive.org/web/20090604130631/http://www.the-efa.org/res/code_2.php, Jun. 4, 2009, retrieved Aug. 9, 2014.
Lynn Wasnak, "Beyond the Basics How Much should I Charge", https://web.archive.org/web/20070121231531/http://www.writersmarket.com/assets/pdf/How_Much_Should_I_Charge.pdf, Jan. 21, 2007, retrieved Aug. 19, 2014.
Summons to Attend Oral Proceedings mailed Sep. 18, 2014 in German Patent Application 10392450.7, filed Mar. 28, 2003.
Examination Report mailed Jul. 22,2013 in German Patent Application 112005002534.9, filed Oct. 12, 2005.

\* cited by examiner

TRANSLATING DOCUMENTS BASED ON CONTENT

BACKGROUND OF THE INVENTION

1. Field of the Invention

The present invention relates generally to natural language translation. More specifically, the present invention relates to translating documents based on content.

2. Related Art

Machine translation involves use of computer systems to translate text or speech from one natural language to another. Using corpus techniques, more complex translations can be achieved relative to simple word substitution approaches. Parallel corpora or other training datasets may be used to train, or effectively 'teach,' a machine translation engine to translate between two languages, thus allowing for better handling of differences in linguistic typology, phrase recognition, translation of idioms, and isolation of anomalies.

SUMMARY OF THE INVENTION

Embodiments of the present technology allow a document containing text in a source language to be translated into a target language based on content associated with that document.

In a first claimed embodiment, a method for translating documents based on content is disclosed. The method includes receiving an indication via a user interface to perform an optimal translation of a document into a target language, wherein the document includes text in a source language. The optimal translation may be executed by a preferred translation engine of a plurality of available translation engines. The preferred translation engine is the most likely to produce the most accurate translation of the document among the plurality of available translation engines. A translated document including text in the target language can be generated from the document using the preferred translation engine residing on a computing device. The translated document may then by outputted by a computing device.

A second claimed embodiment sets forth a method for translating documents based on content. A document including text in a source language may be accessed by a computing device. The document may then be translated into a target language using a preferred translation engine to obtain a translated document. The preferred translation engine may be identified based on content associated with the document. The translated document can be outputted by a computing device.

A system for translating documents based on content is set forth in a third claimed embodiment. The system includes a computing device to receive an indication via a user interface to perform an optimal translation of a document into a target language, wherein the document includes text in a source language. The optimal translation can then be executed by a preferred translation engine of a plurality of available translation engines. The preferred translation engine is the most likely to produce the most accurate translation of the document among the plurality of available translation engines. A translated document including text in the target language and obtained via the optimal translation may be outputted by a computing device included in the system.

In a forth claimed embodiment, a computer-readable storage medium having a program embodied thereon is set forth. The program is executable by a processor to perform a method for translating documents based on content. The method includes receiving an indication via a user interface to perform an optimal translation of a document into a target language, wherein the document includes text in a source language. The optimal translation can be executed by a preferred translation engine of a plurality of available translation engines. The preferred translation engine is the most likely to produce the most accurate translation of the document among the plurality of available translation engines. The method further includes generating a translated document including text in the target language from the document using the preferred translation engine residing on a computing device and outputting the translated document by a computing device.

A fifth claimed embodiment sets forth a computer-readable storage medium having a program embodied thereon. The program is executable by a processor to perform a method for translating documents based on content. The method includes accessing a document including text in a source language, wherein the accessing is performed by a computing device. The method also includes translating the document into a target language using a preferred translation engine to obtain a translated document. The preferred translation engine may be identified based on content associated with the document. The method further includes outputting the translated document, which may be performed by a computing device.

DETAILED DESCRIPTION OF EXEMPLARY EMBODIMENTS

The present technology allows documents to be translated based on content associated therewith. More specifically, given a plurality of available translation engines, a preferred translation engine most likely to perform the highest quality translation for a particular document can be automatically determined. The preferred translation engine may be associated with subject matter similar to content included in that particular document. Furthermore, while the present technology is described herein in the context of textual translations, the principals disclosed can likewise be applied to speech translations such as when employed in conjunction with speech recognition technologies.

Figure 1:
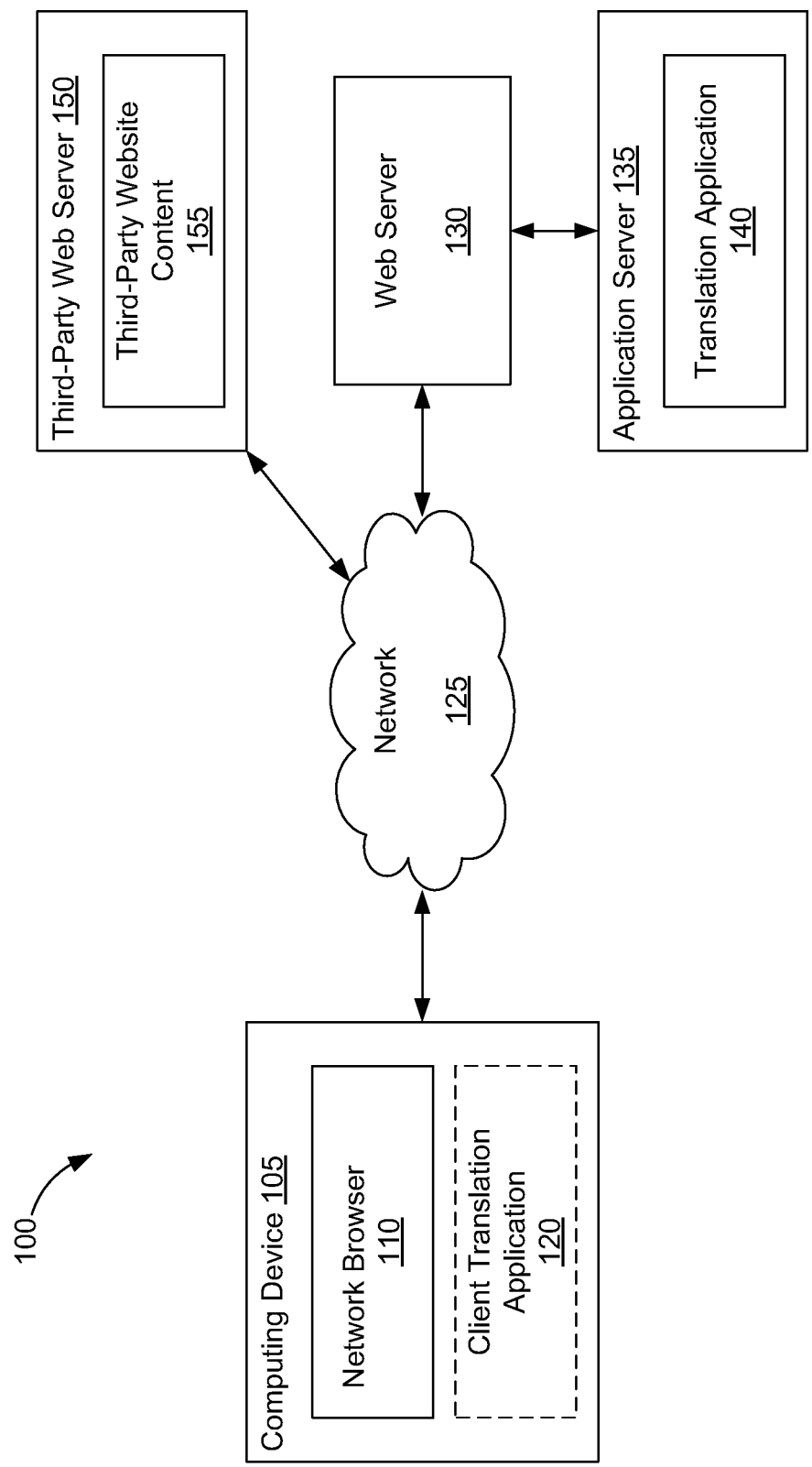
FIG. 1 is a block diagram of an exemplary environment for practicing embodiments of the present technology.

Referring now to FIG. 1, a block diagram of an exemplary environment 100 for practicing embodiments of the present technology is shown. As depicted, the environment 100 includes a computing device 105, a web server 130 and application server 135 that provide a translation system, and a third-party web server 150 that provides third-party website content 155. Communication between the computing device 105, web server 130, and third-party web server 150 is provided by a network 125. Examples of the network 125 include a wide area network (WAN), local area network (LAN), the Internet, an intranet, a public network, a private network, a combination of these, or some other data transfer network.

Examples of the computing device 105 include a desktop personal computer (PC), a laptop PC, a pocket PC, a personal digital assistant (PDA), a smart phone, a cellular phone, a portable translation device, and so on. Web server 130, application server 135 and third-party web server 150 may each be implemented as one or more servers. An exemplary computing system for implementing computing device 105, web server 130, application server 135 and third-party web server 150 is described in further detail in connection with FIG. 6. Additionally, other various components (not depicted) that are not necessary for describing the present technology may also be included in the environment 100, in accordance with exemplary embodiments.

The computing device 105 may include a network browser 110. The network browser may retrieve, present, and traverse and otherwise process information located on a network, including content pages. For example, network browser 110 can be implemented as a web browser which can process a content page in the form of a web page. Network browser 110 may provide an interface as part of a content page or web page. The interface can be implemented from content page data received from the third-party web server 150 or web server 130. Via the interface, computing device 105 can receive an indication from a user to perform an optimal translation of a document. The user may provide the indication via the document itself, location data for the document such as a link (e.g., URL) associated with the document, or other information. The indication may convey a desire to obtain a highly accurate translation based on content included in or associated with the document. The indication may be forwarded either to the third-party web server 150 or the web server 130 via the network 125.

The computing device 105 may include client translation application 120. The client translation application 120 may be a stand-alone executable application residing and executing, at least in part, on the client application and provide an interface for selecting content to have translated. The client translation application 120 may communicate directly with the web server 130, the application server 135, or the third-party web server 150. In the description herein, it is intended that any functionality performed translation application 140, including providing an interface for implementing various functionality, can also be implanted by the client translation application 120. In some embodiments, client translation application 120 may be implemented in place of translation application 140, which is indicated by the dashed lines comprising client translation application 120 in FIG. 1.

The web server 130 may communicate both with the application server 135 and over the network 125, for example to provide content page data to the computing device 105 for rendering in the network browser 110. The content page data may be used by the network browser 110 to provide an interface for selecting an indication of a document to translate, whether stored over a network or locally to the computing device 105. The web server 130 can also receive data associated with an indication from the computing device 105. The web server 130 may process the received indication and/or provide the indication, and optionally any document data, to the application server 135 for processing by translation application 140.

The application server 135 communicates with web server 130 and other applications, for example the client translation applications 120, and includes the translation application 140. The translation application 140 can determine various attributes relating to the document and available translation engines, and generate a translated version of the document, as discussed in further detail herein. The translated document may be transmitted to a user over the network 125 by the application server 135 and the web server 130, for example, through the computing device 105.

The translation application 140 may be part of a translation system that translates documents based on content associated therewith. Generally speaking, the translation application 140 receives an indication to translate a document such as via the network browser 110 and then accesses the document. The translation application 140 then, based on content associated with the document, identifies an available translation engine as a preferred translation engine. The preferred translation engine is most likely to produce the most accurate translation of the document relative to other available translation engines. The preferred translation engine generates a translated document, which is returned to the user. The translation application 140 is described in further detail in connection with FIG. 2. Furthermore, although the translation application 140 is depicted as being a single component of the environment 100, it is noteworthy that the translation application 140 and constituent elements thereof may be distributed across several computing devices that operate in concert via the network 125.

In some embodiments, a content page for allowing a user to configure translation parameters can be provided to that user through the network browser 110. The translation configuration content page can be provided to the network browser 110 by the web server 130 and/or by the third-party web server 150. When provided by the third-party web server 150, the third-party web server 150 may access and retrieve information from the translation system (i.e., the web server 130 and/or the application server 135) to provide a content page having an interface for configuring. In exemplary embodiments, the translation application 140 is accessed by the third-party web server 150. A graphical user interface (GUI) may be implemented within a content page by the third-party web server 150, rendered in the network browser 110, and accessed by a user via the network browser 110 of the computing device 105. According to exemplary embodiments, the GUI can enable a user to identify a document to be translated and select various options related to translating the documents. Such options may include those relating to pricing or translation quality level. In some embodiments, a user can make a selection among several available translation engines via the GUI provided by the third-party website content 155.

According to some exemplary embodiments, the third-party web server 150 may not necessarily provide a translation configuration content page but, instead, may provide content pages containing text. As such, a content page provided by the third-party web server 150 may itself comprise a document to be translated. That is, a user may view a webpage in a source language (e.g., English or French) through the network browser 110 from a content page received from the third-party web server 150. The user may provide input to subsequently view the webpage in a different language (e.g., Spanish). The translation application 140 may access and translate the text provided within the content page, and return a translated version to the network browser 110 or the third-party web server 150 in accordance with embodiments of the present technology.

Figure 2:
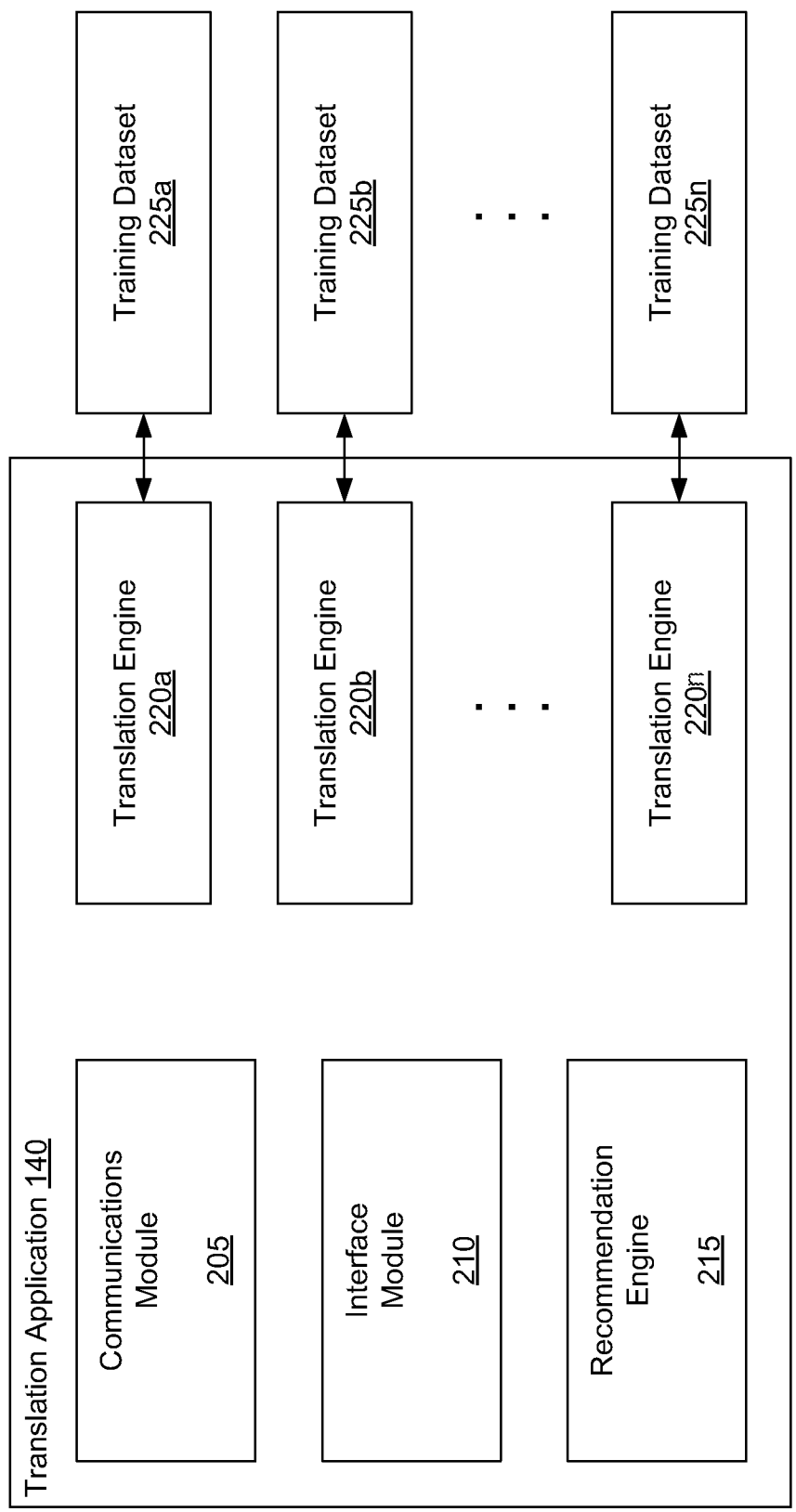
FIG. 2 is a block diagram of an exemplary translation application invoked in the environment depicted in FIG. 1.

FIG. 2 is a block diagram of the exemplary translation application 140 invoked in the environment 100. The translation application 140, as depicted, includes a communications module 205, an interface module 210, a recommendation engine 215, and a plurality of translation engines 220*a*-220*n*. Although FIG. 2 depicts translation engines 220*a*-220*n*, the translation application 140 may comprise any number of translation engines and may be in communication with other translation engines via the network 125. Each of the translation engines 220a-220n is respectively associated with one of the training datasets 225a-225n. The training datasets 225a-225n may or may not be included in the translation application 140. Programs comprising engines and modules of the translation application 140 may be stored in memory of a computing system such as the computing device 105, the web server 130, the application server 135, the third-party web server 150, or any computing device that includes the translation application 140. Additionally, the constituent engines and modules can be executed by a processor of a computing system to effectuate respective functionalities attributed thereto. It is noteworthy that the translation application 140 can be composed of more or fewer modules and engines (or combinations of the same) and still fall within the scope of the present technology. For example, the functionalities of the communications module 205 and the functionalities of the interface module 210 may be combined into a single module or engine.

When executed, the communications module 205 allows an indication to be received via a user interface to perform an optimal translation of a document from a source language to a target language. Such a user interface may include the network browser 110 or a GUI provided by the third-party website content 155. The communications module 205 may also facilitate accessing the document to be translated such as in response to an indication by a user. The document can be accessed based on location information associated with the document. Additionally, the document can be downloaded from the computing device 105, the third-party web server 150, or any other site or device accessible via the network 125. Furthermore, the communications module 205 can be executed such that a translated document is outputted from the translation application 140 to devices accessible via the network 125 (e.g., the computing device 105).

The interface module 210 can be executed to provide a graphical user interface through network browser 110, for example as a content page, that enables a user to select an optimal translation or an alternate translation. The alternate translation may be associated with a user-selected translation engine among the translation engines 220a-220n. The graphical user interface may also provide various options to a user relating to, for example, pricing or translation quality level. According to various embodiments, the graphical user interface may be presented to a user as a content page for network browser 110 via the third-party web server 150 or directly by client translation application 120 at the computing device 105.

According to exemplary embodiments, the recommendation engine 215 is executable to identify a preferred translation engine based on content associated with a document to be translated. The preferred translation engine is most likely to produce the most accurate translation of the document relative to the rest of the available translation engines 220a-220n. The recommendation engine 215 is described in further detail in connection with FIG. 3.

Each of the translation engines 220a-220n comprises a machine translation engine capable of translating from a source language to a target language. Such translation capability may result from training the translation engines 220a-220n on various training data. Higher translation accuracy can be achieved for domain-specific translations when a machine translation engine is trained using a training dataset associated with the same domain or similar subject matter as documents being translated. For example, a translation of a car-repair manual may be of higher quality if the machine translation engine employed was trained using a car-repair-domain-specific training dataset compared to, say, a general training dataset or an unrelated-domain-specific training dataset.

As depicted in FIG. 2, each of the translation engines 220a-220n is associated with one of the training datasets 225a-225n. According to other exemplary embodiments, a given translation engine 220 can be associated with any number of training datasets. The training datasets 225a-225n may each be domain-specific or generic. Accordingly, each of the translation engines 220a-220n may be associated with different subject matter. For example, the translation engine 220a may be associated with consumer electronics, while the translation engine 220b may be associated with agriculture. As such, a document related to some particular subject matter may be translated best by a translation engine 220 associated with the same or closely related subject matter.

Figure 3:
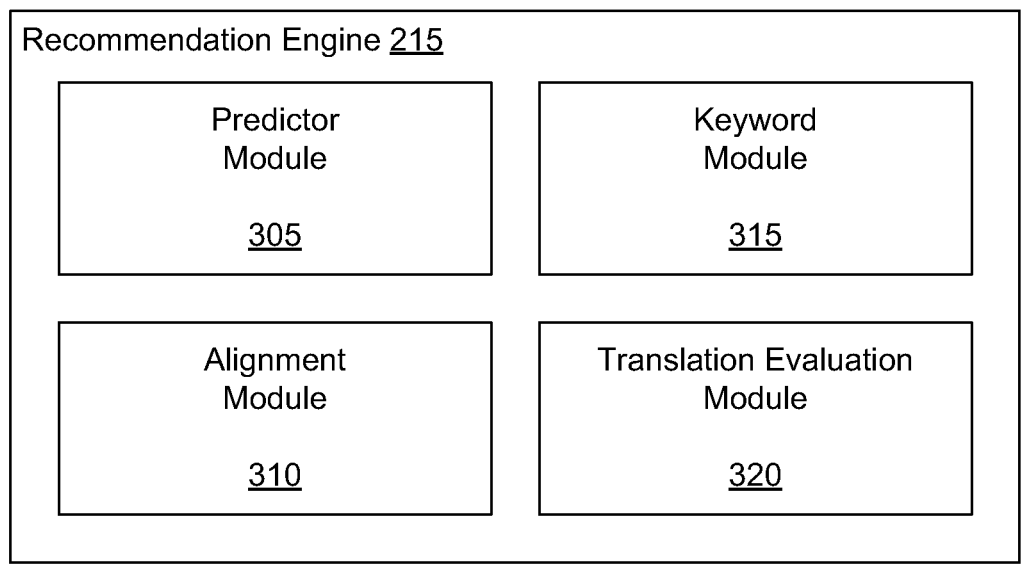
FIG. 3 is a block diagram of an exemplary recommendation engine included in the translation application.

FIG. 3 is a block diagram of the exemplary recommendation engine 215 included in the translation application 140. The recommendation engine may identify a preferred translation engine among the translation engines 220a-220n based on content associated with the document by employing one or more constituent modules. The depicted recommendation engine 215 includes a predictor module 305, an alignment module 310, a keyword module 315, and a translation evaluation module 320, all of which may be stored in memory and executed by a processor to effectuate the functionalities attributed thereto. Furthermore, the recommendation engine 215 can be composed of more or fewer modules (or combinations of the same) and still fall within the scope of the present technology. For example, the functionalities of the alignment module 310 and the functionalities of the keyword module 315 may be combined into a single module or engine.

The predictor module 305 can be executed to predict a translation quality associated with each of the translation engines 220a-220n for a given document or batch of documents to be translated. Such a quality prediction can be based, for example, on previous translations performed by the translation engines 220a-220n. The quality prediction may also be based on user feedback. The translation engine having the highest translation quality prediction may be selected as the preferred translation engine.

Execution of the alignment module 310 allows a degree of alignment to be measured between content associated with a given document and content included in each of the training datasets 225a-225n. For example, if a document to be translated is an article by the French historian, René Girard, a training dataset 225 related to French or European history may possess is closer degree of alignment compared to a training dataset 225 related to jazz instruments. Degrees of alignment may be measured using, for example, various cross-correlation techniques. A translation engine 220 associated with the training dataset 225 having the closest degree of alignment may be selected as the preferred translation engine.

The keyword module 315 is executable to identify and/or track keywords included in the training datasets 225a-225n and in documents to be translated, in accordance with exemplary embodiments. Keywords may be tagged, and may allow a document or training dataset 225 to be categorized. A translation engine 220 associated with a training dataset 225 having keywords related to those of a document to be translated may be selected as the preferred translation engine.

The translation evaluation module 320 may be executed to evaluate translations of a given document generated by each of the translation engines 220a-220n for accuracy. The most accurate translation may then be identified. The translation engine 220 associated with the most accurate translation may be selected as the preferred translation engine.

Figure 4:
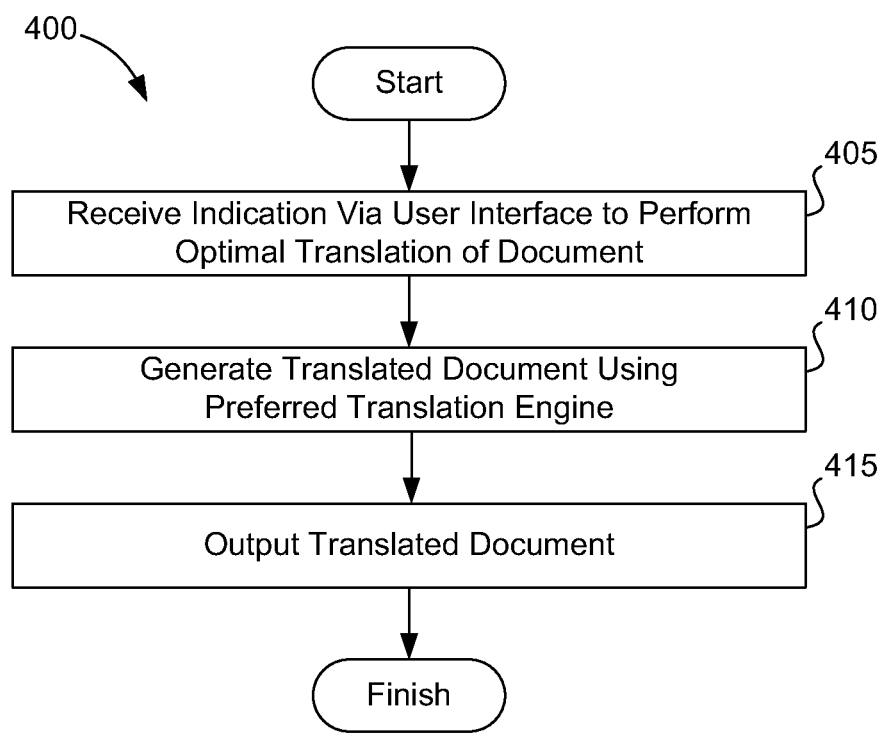
FIG. 4 is a flowchart of an exemplary method for translating documents based on content.

FIG. 4 is a flowchart of an exemplary method 400 for translating documents based on content. The steps of the method 400 may be performed in varying orders. Additionally, steps may be added or subtracted from the method 400 and still fall within the scope of the present technology.

In step 405, an indication to perform an optimal translation of a document from a source language to a target language is received. The indication may be ultimately communicated to the translation application 140 from the computing device 105. For example, the indication may be received through an interface provided through the network browser 110 or an interface provided by the client translation application 120. When received through an interface provided by the network browser 110, the interface can be provided from a content page provided by the web server 130 or the third-party web server 150. The indication may also be received by any computing device that includes the translation application 140.

In step 410, a translated document is generated that includes text in the target language. The translated document may be generated using a preferred translation engine among a plurality of available translation engines (e.g., the translation engines 220a-220n). The preferred translation engine is the translation engine most likely to produce the most accurate translation of the document among the plurality of available translation engines, such as may be determined by the recommendation engine 215. According to various embodiments, the preferred translation engine may reside on the computing device 105, the third-party web server 150, the web server 130, the application server 135, or some other device.

In step 415, the translated document is outputted, such as by a computing device. The communications module 205 can be executed to output the translated document from the translation application 140 to devices accessible via the network 125 such as the computing device 105, in accordance with exemplary embodiments. Examples of suitable output formats include a content page (e.g., web page) which can be viewed through network browser 110, emailed text, or other format.

Figure 5:
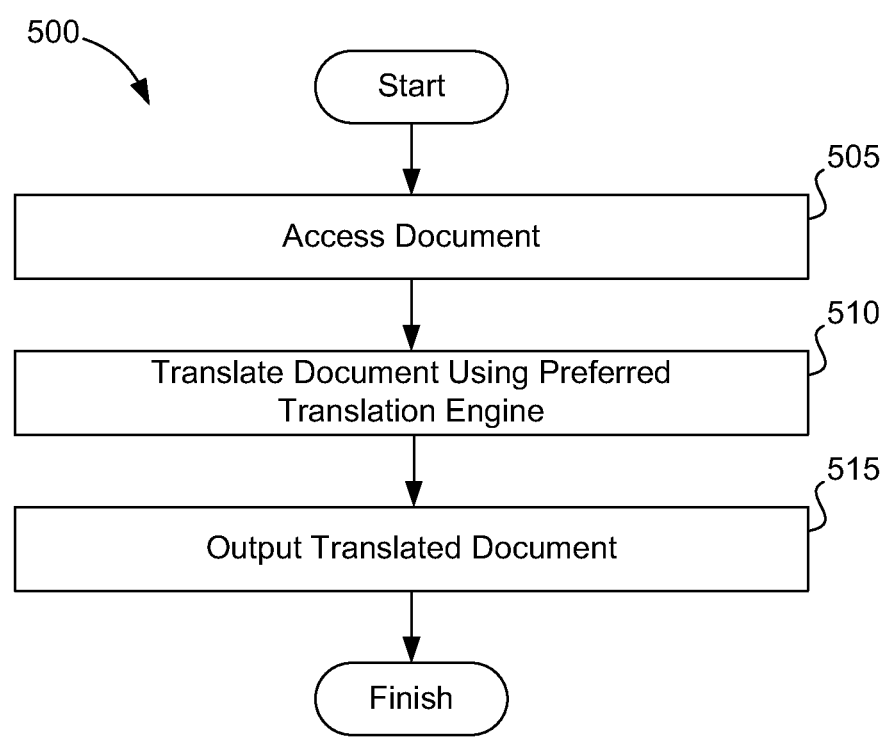
FIG. 5 is a flowchart of another exemplary method for translating documents based on content.

FIG. 5 is a flowchart of another exemplary method 500 for translating documents based on content. The steps of the method 500 may be performed in varying orders. Steps may also be added or subtracted from the method 500 and still fall within the scope of the present technology.

In step 505, a document that includes text in a source language is accessed, such as by a computing device. The communications module 205 may facilitate accessing the document to be translated such as in response to an indication by a user. The document can also be accessed based on location information associated with the document. Additionally, the document can be downloaded from the computing device 105, the third-party web server 150, or any other site or device accessible via the network 125.

In step 510, the document is translated into a target language using a preferred translation engine to obtain a translated document. The preferred translation engine is the most likely to produce the most accurate translation of the document among the plurality of available translation engines, such as may be determined by the recommendation engine 215. The preferred translation engine may be identified based on content associated with the document. According to various embodiments, the preferred translation engine may reside on the computing device 105, the third-party web server 150, or a server implementing the translation application 140.

In step 515, the translated document is outputted, such as by a computing device. The translated document may be outputted from the translation application 140 to devices accessible via the network 125 such as the computing device 105 by way of execution of the communications module 205.

Figure 6:
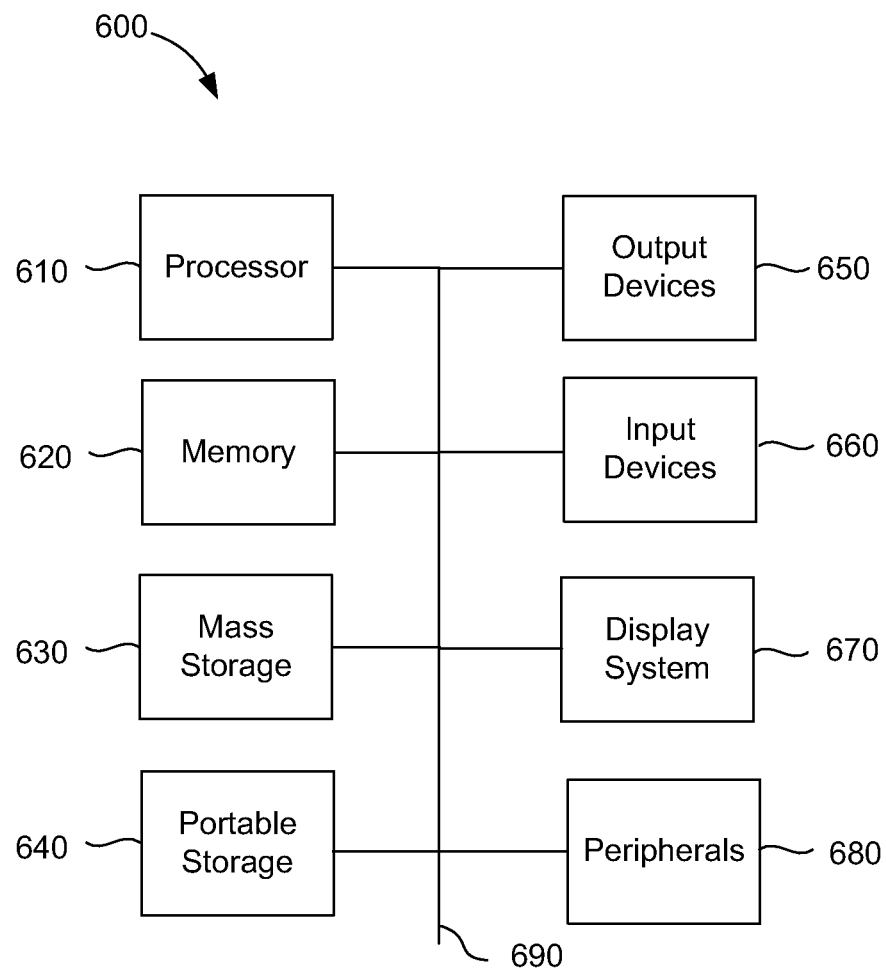
FIG. 6 illustrates an exemplary computing system that may be used to implement an embodiment of the present technology.

FIG. 6 illustrates an exemplary computing system 600 that may be used to implement an embodiment of the present technology. The computing system 600 may be implemented in the contexts of the likes of the computing device 105, a server implementing the third-party website content 155, and a server implementing the translation application 140. The computing system 600 includes one or more processors 610 and main memory 620. Main memory 620 stores, in part, instructions and data for execution by processor 610. Main memory 620 can store the executable code when in operation. The computing system 600 further includes a mass storage device 630, portable storage medium drive(s) 640, output devices 650, input devices 660, a display system 670, and peripherals 680.

The components shown in FIG. 6 are depicted as being connected via a single bus 690. The components may be connected through one or more data transport means. The processor 610 and the main memory 620 may be connected via a local microprocessor bus, and the mass storage device 630, the peripherals 680, the portable storage medium drive(s) 640, and display system 670 may be connected via one or more input/output (I/O) buses.

The mass storage device 630, which may be implemented with a magnetic disk drive or an optical disk drive, is a non-volatile storage device for storing data and instructions for use by the processor 610. The mass storage device 630 can store the system software for implementing embodiments of the present invention for purposes of loading that software into the main memory 620.

The portable storage medium drive(s) 640 operates in conjunction with a portable non-volatile storage medium, such as a floppy disk, compact disk, digital video disc, or USB storage device, to input and output data and code to and from the computing system 600 of FIG. 6. The system software for implementing embodiments of the present invention may be stored on such a portable medium and input to the computing system 600 via the portable storage medium drive(s) 640.

The input devices 660 provide a portion of a user interface. The input devices 660 may include an alpha-numeric keypad, such as a keyboard, for inputting alpha-numeric and other information, or a pointing device, such as a mouse, a trackball, stylus, or cursor direction keys. Additionally, the computing system 600 as shown in FIG. 6 includes the output devices 650. Suitable output devices include speakers, printers, network interfaces, and monitors.

The display system 670 may include a liquid crystal display (LCD) or other suitable display device. The display system 670 receives textual and graphical information, and processes the information for output to the display device.

The peripherals 680 may include any type of computer support device to add additional functionality to the computer system. The peripherals 680 may include a modem or a router.

The components contained in the computing system 600 of FIG. 6 are those typically found in computer systems that may be suitable for use with embodiments of the present invention and are intended to represent a broad category of such computer components that are well known in the art. Thus, the computing system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method using a computing system for translating documents based on content, the method comprising:
   receiving an request via a user interface of the computing system to perform an optimal translation of a document into a target language, the document comprising text in a source language;
   identifying keywords included in a plurality of training datasets and in the document using a keyword module of the computing system;
   selecting a preferred translation engine associated with a training data set having identified keywords that are related to identified keywords included in the document; and
   directing the preferred translation engine to generate a translated document comprising text in the target language from the document.

2. The method of claim 1, further comprising:
   tagging the identified keywords; and
   categorizing the document and training datasets based on the tagging.

3. The method of claim 1, wherein each of a plurality of available translation engines is associated with a training dataset having a different subject matter.

4. The method of claim 3, wherein the subject matter associated with the preferred translation engine is related to content associated with the document.

5. The method of claim 1, further comprising accessing the document based on location information received through the user interface.

6. The method of claim 1, further comprising providing a graphical user interface that enables a user to select the optimal translation or an alternate translation, the alternate translation associated with a user-selected translation engine among a plurality of available translation engines.

7. A method for translating documents based on content, using a computing device that comprises a processor and memory for storing executable instructions, the processor executing the instructions to perform the method, the method comprising:
   accessing a document comprising text in a source language;
   predicting a translation quality associated with each of a plurality of translation engines using a predictor module;
   measuring a degree of alignment between the content associated with the document and content included in each of a plurality of training datasets, each of the plurality of training datasets associated with a different available translation engine;
   selecting a preferred translation engine based on the predicted translation quality;
   selecting the translation engine associated with the training dataset having the closest degree of alignment as the preferred translation engine;
   directing the preferred translation engine to translate the document into a target language to obtain a translated document; and
   outputting the translated document.

8. The method of claim 7, wherein the preferred translation engine is most likely to produce the most accurate translation of the document relative to the rest of a plurality of available translation engines.

9. The method of claim 8, wherein each of the plurality of available translation engines is associated with different subject matter.

10. The method of claim 7, further comprising determining the preferred translation engine from the plurality of available translation engines.

11. The method of claim 10, wherein the determining comprises:
   evaluating, using a translator evaluation module, previous translations performed by each of the plurality of translation engines;
   predicting a translation quality associated with each of the plurality of available translation engines based on the previous translations; and
   selecting the translation engine with the highest translation quality prediction as the preferred translation engine.

12. A system for translating documents based on an alignment of content, the system comprising:
   a computing device to receive an indication via a user interface to perform an optimal translation of a document into a target language, the document comprising text in a source language, the optimal translation to be executed by a preferred translation engine;
   a plurality of available translation engines each including a training dataset for a different subject matter;

an alignment module to measure, using cross correlation, a degree of alignment between content associated with the document and content included in each of the training datasets;
a recommendation engine stored in memory and executable by a processor to identify a preferred translation engine based on the degree of alignment of the training dataset included in the selected translation engine; and
a computing device to output a translated document obtained via the optimal translation executed using the preferred translation engine, the translated document comprising text in the target language.

13. The system of claim 12, wherein the recommendation engine is further configured to identify the preferred translation engine based on content associated with the document.

14. The system of claim 12, wherein each of the plurality of available translation engines is associated with different subject matter.

15. The system of claim 12, wherein the subject matter associated with the preferred translation engine is related to content associated with the document.

16. The system of claim 12, further comprising a communications module stored in memory and executable by a processor to access the document based on location information associated with the document and received through the user interface.

17. The system of claim 12, further comprising an interface module stored in memory and executable by a processor to provide a graphical user interface that enables a user to select the optimal translation or an alternate translation, the alternate translation associated with a user-selected translation engine of the plurality of available translation engines.

18. A non-transitory computer-readable storage medium having a program embodied thereon, the program being executable by a processor to perform a method for translating documents based on content, the method comprising:
receiving an indication via a user interface to perform an optimal translation of a document into a target language, the document comprising text in a source language;
measuring a degree of alignment between the text associated with the document and content included in each of a plurality of training datasets, each of the plurality of training datasets associated with a different available translation engine;
selecting the translation engine associated with the training dataset having the closest degree of alignment as a preferred translation engine, the optimal translation to be executed by the preferred translation engine;
requesting the preferred translation engine to generate a translated document comprising text in the target language from the document; and
requesting to output of the translated document.

19. A non-transitory computer-readable storage medium having a program embodied thereon, the program being executable by a processor to perform a method for translating documents based on content, the method comprising:
accessing a document comprising text in a source language;
identifying keywords included in a plurality of training datasets and in the document;
selecting a preferred translation engine associated with a training data set having identified keywords that are related to identified keywords included in the document;
translating the document into a target language using the preferred translation engine to obtain a translated document; and
outputting the translated document.

* * * * *

UNITED STATES PATENT AND TRADEMARK OFFICE
CERTIFICATE OF CORRECTION

| | | |
|---|---|---|
| PATENT NO. | : 8,990,064 B2 | Page 1 of 1 |
| APPLICATION NO. | : 12/510913 | |
| DATED | : March 24, 2015 | |
| INVENTOR(S) | : Marcu et al. | |

It is certified that error appears in the above-identified patent and that said Letters Patent is hereby corrected as shown below:

In the Claims

Col. 9 line 45-60 claim 1 delete "A method using a computing system" to and ending "the document." and insert the following claim:

--A method using a computing system tor translating documents based on content, the method comprising:
receiving a request via a user interface of the computing system to perform an optimal translation of a document into a target language, the document comprising text in a source language;
identifying keywords included in a plurality of training datasets and in the document using a keyword module of the computing system;
selecting a preferred translation engine associated with a training data set having identified keywords that are related to identified keywords included in the document; and
directing the preferred translation engine to generate a translated document comprising text in the target language from the document.--

Signed and Sealed this
Twenty-third Day of June, 2015

Michelle K. Lee
*Director of the United States Patent and Trademark Office*